Oct. 28, 1952  W. W. CROW  2,615,461
AUTOMATIC FIRE AND EARTHQUAKE RESPONSIVE CUTOFF VALVE
Filed March 9, 1950  2 SHEETS—SHEET 1
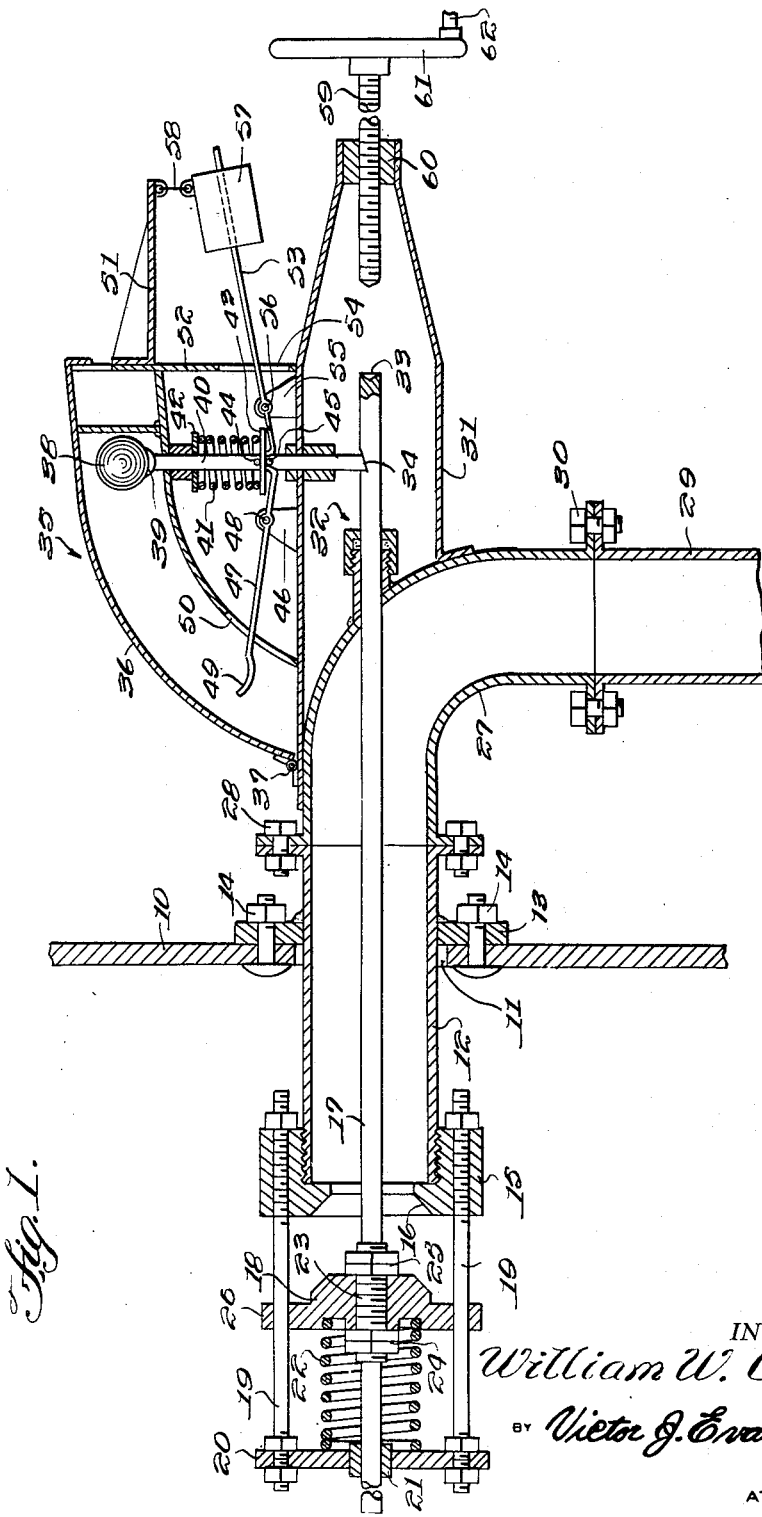
INVENTOR.
William W. Crow,
BY Victor J. Evans & Co.
ATTORNEYS Oct. 28, 1952 W. W. CROW 2,615,461
AUTOMATIC FIRE AND EARTHQUAKE RESPONSIVE CUTOFF VALVE
Filed March 9, 1950 2 SHEETS—SHEET 2
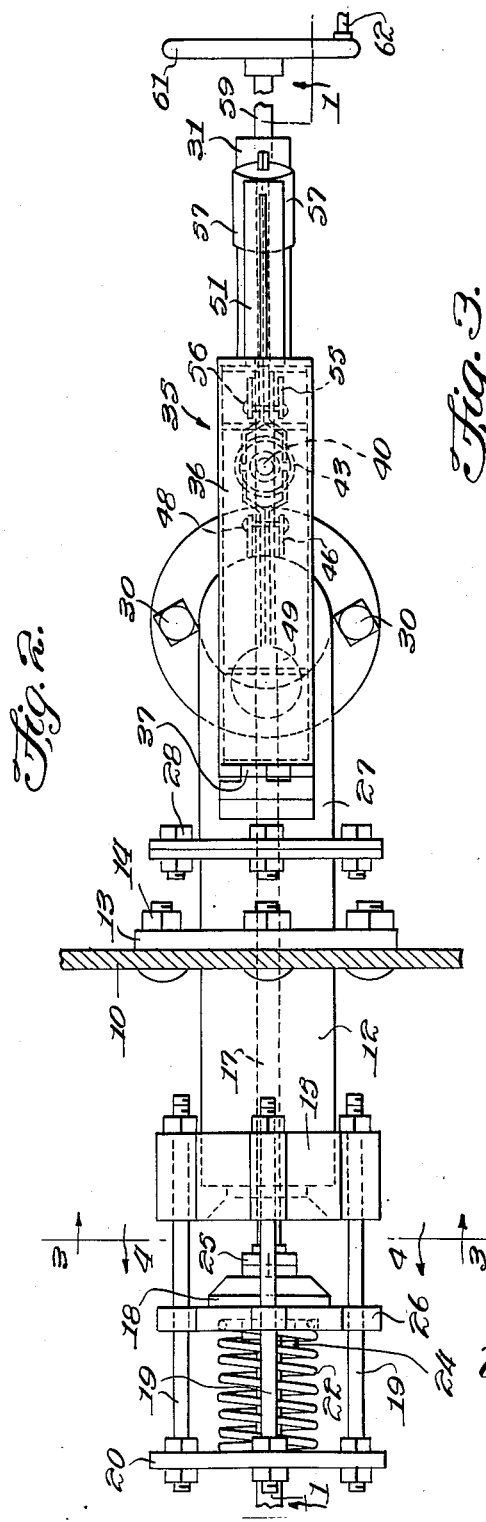
INVENTOR.
William W. Crow,
BY Victor J. Evans & Co.
ATTORNEYS Patented Oct. 28, 1952

2,615,461

UNITED STATES PATENT OFFICE 2,615,461

AUTOMATIC FIRE AND EARTHQUAKE RESPONSIVE CUTOFF VALVE

William Willis Crow, Bell Gardens, Calif.

Application March 9, 1950, Serial No. 148,589

2 Claims. (Cl. 137—39)

This invention relates to a cut-off mechanism, and more particularly to a mechanism for shutting off the flow of fluid, such as inflammable gas and the like, in the event of fire, earthquakes or other violent shocks.

The object of the invention is to provide a cut-off mechanism which will close a valve in a pipe line to stop the flow of fluid or gas therethrough in case of fire, earthquakes or other violent shocks, the mechanism being provided with a manually operable means for readily resetting the mechanism after it has been actuated.

Another object of the invention is to provide a valve for cutting off the flow of gas or liquid therethrough upon the occurrence of either a fire or earthquake, the valve being constructed so that the normal flow of material therethrough is not impeded or interfered with.

A further object of the invention is to provide a cut-off mechanism which is extremely simple and inexpensive to manufacture.

Other objects and advantages will be apparent during the course of the following description.

In the accompanying drawings forming a part of this application, and in which like numerals are used to designate like parts throughout the same:

Figure 1 is a sectional view taken on the line 1—1 of Figure 2;

Figure 2 is a top plan view of the cut-off mechanism of the present invention attached to a section of a tank;

Figure 3 is a sectional view taken on the line 3—3 of Figure 2;

Figure 4 is a sectional view taken on the line 4—4 of Figure 2.

Referring in detail to the drawings, the numeral 10 designates a portion of a tank that may contain any material, such as an inflammable gas or liquid. The tank 10 is provided with an opening 11 through which projects a pipe 12 which is part of the cut-off mechanism of the present invention. The present invention is directed to a cut-off mechanism whereby normal flow of liquid or gas from the tank 10 will be stopped in the event of a fire, earthquake or other violent shock, so that this gas or liquid cannot increase the hazards resulting from the fire or earthquake.

For connecting the pipe 12 to the tank 10, a collar 13 is secured to the exterior of the pipe 12, as by welding, Figure 1, and suitable bolt- and-nut assemblies 14 serve to connect the collar 13 to the tank 10. Arranged in threaded engagement with an end of the pipe 12 is a socket member 15, and the socket member 15 is provided with a valve seat 16 for a purpose to be later described. A movable or reciprocating rod 17 extends through the pipe 12 and mounted on the rod 17 is a plunger or valve 18. The plunger 18 is mounted for movement into and out of bridging relation with respect to the seat 16 so as to selectively prevent or stop flow of gas or liquid through the pipe 12.

Each of a plurality of spaced parallel guide bolts 19 has one end arranged in threaded engagement with the socket member 15, and mounted on the other ends of the bolts 19 is a plate 20. A sleeve 21 is arranged centrally in the plate 20 and the end of the rod 17 slidably projects through the sleeve 21. A coil spring 22 is circumposed on the rod 17, and the coil spring is interposed between the plate 20 and the plunger 18, the coil spring 22 serving to normally urge the plunger 18 into bridging relation with respect to the seat 16. The plunger 18 is arranged in threaded engagement with the threaded portion 23 of the rod 17, and nuts 24 and 25 serve to maintain the plunger 18 in its proper position on the threaded portion 23. Projecting from the plunger 18 or formed integrally therewith is a plurality of apertured ears 26 through which the bolts 19 project, Figure 4. Thus, the bolts 19 serve to guide the plunger during its movement, but these bolts do not interfere with opening and closing of the plunger 18.

Arranged contiguous to the other end of the pipe 12 is a 90-degree elbow 27, Figure 1. Suitable bolt-and-nut assemblies 28 serve to connect the elbow 27 to the pipe 12, and a suitable section of pipe 29 may be connected to the elbow 27 by bolt-and-nut assemblies 30. Normally, material, such as liquid or inflammable gas, flows from the tank through the pipe 12, thence through the elbow 27, and thence through the pipe section 29. However, in the event of an earthquake or fire, the plunger 18 moves into bridging relation with respect to the seat 16 so that further flow of material through these members is prevented, as later described in this application.

Secured to the exterior of the elbow 27 is a hollow casing 31. A packing member 32 is also secured to the exterior of the elbow 27, and the rod 17 slidably projects through the packing 32 and into the casing 31. The end of the rod 17 projecting into the casing 31 is provided with an indentation or recess 33 for a purpose to be later described. The rod 17 is also provided with a notch or slot 34 adjacent the recess 33.

Secured to the exterior of the casing 31 is a housing 35. A cover 36 is hingedly connected to the casing 31 by a hinge 37 so that the cover 36 can be pivoted or swung open whereby the ball 38 can be reset. The ball 38 is normally supported on a seat 39 that is mounted on the upper end of a movable stem 40. The lower end of the stem 40 is cut away or inclined, and the lower end of the stem 40 is adapted to be seated in or engaged in the notch 34 in the rod 17 so as to maintain the plunger 18 in its open position normally. The stem 40 slidably projects through the casing 31 and through the housing 35 and a coil spring 41 is circumposed on the stem 40. The stem 40 slidably projects through a first or upper plate 42, and a second plate 43 is arranged below the plate 42, the second plate 43 being carried by the stem 40. A pair of pins 44 and 45 straddle the plate 43 so that as the plate 43 is moved, the stem 40 is moved therewith.

A lever 47 is pivotally connected to ears or lugs 46 by a pin 48, the lugs 46 being secured to the casing 31. One end of the lever 47 is arranged in engagement with the lower surface of the plate 43, while the other end of the lever 47 is shaped to define a cup-like member 49 which is adapted to receive the ball 38 when the ball 38 is dislodged from its seat 39 by earthquakes or other violent shocks. Thus, the ball 38 is of sufficient weight so that when it is dislodged from its seat, and when it rolls down onto the portion 49 of the lever 47, the lever 47 will be pivoted in a counterclockwise direction to thereby lift the stem 40 so that the coil spring 22 will urge the plunger 18 forwardly into bridging relation with respect to the seat 16, whereby further flow of material through the pipe 12 will be prevented. The lever 47 projects through a slot 50 in the housing 35.

A means is also provided for causing the plunger 18 to move into bridging relation with respect to the seat 16 in the event of a fire or intense heat in the vicinity of the cut-off mechanism of the present invention. This means includes a bracket 51 that is secured, as by welding, to the upper portion of a brace 52, the brace 52 having its lower end secured to the exterior of the casing 31. A lever 53 projects through a slot 54 in the brace 52, the lever 53 being pivotally connected to lugs 55 by a pin 56. One end of the lever 53 is arranged in engagement with the lower surface of the plate 43, and a weight 57 is mounted on the other end of the lever 53. A link or cord 58 which is fabricated of a fusible material, such as Celluloid or the like, serves to normally maintain the weight 57 in its raised position. However, in the event that a fire occurs or breaks out in the vicinity of the cut-off mechanism, the link 58 will be burned or melted so that the weight 57 will drop or move in a clockwise direction, whereby the lever 53 will raise or move the stem 40 vertically so as to again permit the plunger 18 to move forwardly. It is to me noted that there is sufficient clearance between the top of the ball 38 and the cover 36 so that there will be no interference with the upward movement of the stem 40 when the link 53 is actuated.

A manually operable means is provided for resetting the rod 17 and plunger 18 after the plunger 18 has moved to its closed position. This last-named means comprises a threaded shaft or screw member 59 which is arranged in threaded engagement with a bushing 60 which is mounted in the outer end of the casing 31. A wheel 61 is connected to the outer end of the screw member 59, there being a hand grip 62 projecting from the wheel 61 for rotating the latter. Thus, in the event that the earthquake or fire causes the rod 17 and plunger 18 to move forwardly, and after the fire has dissipated itself or after it has been extinguished, the hand wheel 61 is rotated in a clockwise direction to move the screw member 59 into engagement with the recess 33, whereby the rod 17 will be moved back to the position shown in Figure 1, so that the stem 40 can engage in the notch 34 and maintain the plunger 18 in its open or retracted position.

In use, the parts are normally in the position shown in Figure 1. Thus, whenever material is in the tank 10, such as inflammable gas or liquid, it can flow through the valve seat 16, thence through the pipe 12, thence through the elbow 27 and out through the pipe section 29 to any desired location. Then, in the event of a fire or earthquake, the mechanism of the present invention will be actuated to prevent further flow of liquid or gas through the pipe 12. Thus, in the event of an earthquake or other violent shock, the ball 38 will be dislodged from its seat 39 and then will roll down onto the portion 49 of the lever 47. This will cause the lever 47 to be pivoted in a counterclockwise direction, to thereby raise the stem 40 so that the spring 22 will urge the plunger 18 into bridging relation with respect to the seat 16. The seat 39 may be of any desired diameter, depending upon the size of the shock or earthquake that is anticipated. In the event of a fire, then the link 58 will burn or melt so that the weight 57 will drop, whereby the lever 53 will pivot in a clockwise direction to again lift the stem 40 so as to permit the spring 22 to urge the plunger 18 into bridging relation with respect to the seat 16.

After the fire or earthquake has subsided, the user can rotate the wheel 61 in a proper direction to thereby move the screw member 59 into engagement with the adjacent end of the rod 17 so as to force the plunger 18 way from the seat 16. Then, the lower end of the stem 40 will engage in the notch 34 to maintain the rod 17 and plunger 18 in their open position. The cover 36 can be pivoted about the hinge 37 in order to manually reset the ball 38 on its seat 39.

The device of the present invention is especially suitable for storage tanks in which various types of liquid may be stored. The seat 39 may be detachably connected to the upper end of the stem 40 so that various sizes of seats can be used as desired. The mechanism of the present invention can be readily reset and be used over and over again, it being only necessary to replace the link 58, when such link has been burned away. The mechanism can be constructed of plain or standard steel pipe and other ordinary materials, so that the cost of manufacturing will be very low.

I claim:

1. In a cut-off mechanism, an open-ended pipe adapted to be connected to a tank, a bushing arranged on an end of said pipe and provided with a valve seat, a plurality of guide bolts projecting from said bushing, a plate secured to the projecting ends of said bolts, a plunger slidably connected to said guide bolts and mounted for movement into and out of bridging relation with respect to said seat, a reciprocating rod extending through said pipe and through said plunger, a coil spring circumposed on said rod and interposed between said plate and plunger, a 90-degree elbow connected to the other end of said pipe, a casing secured to said elbow, said rod extending through said elbow and into said casing, a screw member projecting into said casing and adapted to engage an end of said rod, a manually operable wheel for rotating said screw member, an inclined housing secured to the top of said casing, there being a notch in said rod, a slidable stem having its lower end adapted to engage the notch in said rod, a seat arranged on the upper end of said stem, a ball arranged in said housing and normally seated on the seat of said stem for urging said stem into engagement with said notch, a lever pivotally connected to said casing, said ball adapted to be dislodged from its seat upon occurrence of a shock whereby said ball rolls into engagement with said lever to cause said lever to move said stem out of engagement with said notch whereby said plunger will move into bridging relation with respect to the seat in said bushing.

2. The apparatus as described in claim 1, and further including heat-responsive means for causing said plunger to move into bridging relation with respect to the seat in said bushing.

WILLIAM WILLIS CROW.

REFERENCES CITED

The following references are of record in the file of this patent:

UNITED STATES PATENTS

| Number | Name | Date |
|---|---|---|
| 432,404 | Grinnell | July 15, 1890 |
| 704,529 | Foskett | July 15, 1902 |
| 855,416 | Rockwell | May 28, 1907 |
| 1,302,749 | Yeamans | May 6, 1919 |
| 1,742,685 | Brandon | Jan. 7, 1930 |
| 1,743,314 | Brandon | Jan. 14, 1930 |
| 2,229,543 | Bailey | Jan. 21, 1941 |